(12) United States Patent
Lacagnina et al.

(10) Patent No.: US 6,783,618 B2
(45) Date of Patent: Aug. 31, 2004

(54) METHOD AND APPARATUS FOR THE MANUFACTURING OF A TIRE FOR VEHICLE WHEELS

(75) Inventors: Claudio Lacagnina, Busto Arsizio (IT); Gian Luigi Bosio, Bagnolo Cremasco (IT)

(73) Assignee: Pirelli Pneumatici S.p.A., Milan (IT)

( * ) Notice: Subject to any disclaimer, the term of this patent is extended or adjusted under 35 U.S.C. 154(b) by 335 days.

(21) Appl. No.: 10/013,544

(22) Filed: Dec. 13, 2001

(65) Prior Publication Data

US 2002/0108716 A1 Aug. 15, 2002

Related U.S. Application Data

(60) Provisional application No. 60/265,597, filed on Feb. 2, 2001.

(30) Foreign Application Priority Data

Dec. 22, 2000 (EP) .............................................. 00830844

(51) Int. Cl.$^7$ ................................................ B29D 30/20
(52) U.S. Cl. ..................... 156/111; 156/130.7; 156/133; 156/396
(58) Field of Search ................................ 156/111, 396, 156/130.7, 131, 132, 133, 135, 398–403

(56) References Cited

U.S. PATENT DOCUMENTS 3,990,931 A    11/1976  Leblond et al.
4,473,427 A  *  9/1984  Irie .............................. 156/396
5,141,587 A  *  8/1992  Sumiuchi et al. ........... 156/396
5,380,384 A  *  1/1995  Tokunaga et al. ........... 156/111

FOREIGN PATENT DOCUMENTS

| EP | 0676277   | 11/1995 |
| EP | 0 822 059 | 2/1998  |
| EP | 0 997 263 | 5/2000  |
| FR | 2.093.180 | 1/1972  |

* cited by examiner

Primary Examiner—Geoffrey L. Knable
(74) Attorney, Agent, or Firm—Finnegan, Henderson, Farabow, Garrett & Dunner, L.L.P.

(57) ABSTRACT

A method of manufacturing a tire for a vehicle wheel includes forming a carcass sleeve, transferring the carcass sleeve onto a shaping drum, shaping the carcass sleeve to apply a belt structure and a tread band, and applying a pair of sidewalls against side surfaces of the carcass sleeve. Each of the sidewalls extends between an annular reinforcing structure and a side edge of the tread band. Before transferring the carcass sleeve onto the shaping drum, the sidewalls are positioned on an intermediate drum, the carcass sleeve is transferred onto the intermediate drum, and inner end flaps of each sidewall are engaged against the carcass sleeve at the annular reinforcing structures. A related apparatus for manufacturing tires for vehicle wheels includes a building drum, a shaping drum, one or more transfer devices for moving the carcass sleeve from the building drum to the shaping drum, an intermediate drum, and an auxiliary unit.

21 Claims, 4 Drawing Sheets

METHOD AND APPARATUS FOR THE MANUFACTURING OF A TIRE FOR VEHICLE WHEELS

CROSS-REFERENCE TO RELATED APPLICATIONS

Applicants claim the right of priority under 35 U.S.C. §119(a)–(d) based on patent application No. 00830844.7, filed Dec. 22, 2000, in the European Patent Office; additionally, Applicants claim the benefit under 35 U.S.C. §119(e) based on prior-filed, copending provisional application No. 60/265,597, filed Feb. 2, 2001, in the U.S. Patent and Trademark Office; the contents of both of which are relied upon and incorporated herein by reference.

BACKGROUND OF THE INVENTION

1. Field of the Invention

The present invention relates to a method of manufacturing a tire for vehicle wheels, of the type comprising the steps of: forming a carcass sleeve comprising a pair of annular reinforcing structures at the beads axially spaced apart from each other and at least one carcass ply having opposite end flaps each turned up at one of said annular reinforcing structures; transferring the carcass sleeve onto a shaping drum; shaping the carcass sleeve into a toroidal configuration to apply it to a belting structure at a radially inner position thereof and to a tread band circumscribing said belting structure; applying a pair of sidewalls against side surfaces of the carcass sleeve, each of said pair of sidewalls extending radially between one of the annular reinforcing structures and a side edge of the tread band.

The invention also relates to an apparatus for manufacturing a tire for vehicle wheels comprising: a building drum to form a carcass sleeve comprising a pair of annular reinforcing structures at the beads axially spaced apart from each other, and at least one carcass ply having opposite end flaps each turned up at one of said annular reinforcing structures; a shaping drum to form a tire comprising said carcass sleeve, a belting structure paired with a radially external tread band, and a pair of sidewalls applied against respective side surfaces of the carcass sleeve, each of them extending between one of said annular reinforcing structures at the beads and a side edge of the tread band, applicator devices being associated with the shaping drum to apply each sidewall to the respective side surface of the carcass sleeve; transfer devices for moving the carcass sleeve from the building drum to the shaping drum.

2. Description of the Related Art

A tire for vehicle wheels generally comprises a carcass structure having at least one carcass ply provided with respectively opposite end flaps each turned up in the form of a loop around annular reinforcing structures, each of which is usually made up of a circumferentially inextensible annular insert to which at least one filling insert is applied at a radially outer position thereof.

Associated with the carcass structure is a belting structure comprising one or more textile belt layers disposed in radial superposed relationship with respect to each other and to the carcass ply and provided with textile or metallic reinforcing cords of a respectively crossed orientation or substantially parallel to the circumferential extension direction of the tire. Applied to the belting structure, at a radially outer position thereof, is a tread band also made of elastomer material like other semifinished constituent parts of the tire.

It is to be pointed out that, to the aims of the present invention, by the term "elastomer material" it is intended a rubber blend in its entirety, that is the assembly made up of a base polymer suitably amalgamated with reinforcing fillers and/or process additives of various types.

Also applied to the side surfaces of the carcass structure, each extending from one of the side edges of the tread band until close to the respective annular reinforcing structure at the beads, are respective sidewalls of elastomer material that, depending on the different embodiments, can have respective radially-external end edges either superposed on the side edges of the tread band to form a construction pattern of the type usually referred to as "overlying sidewalls" or interposed between the carcass structure and the side edges of the tread band, according to a construction pattern of the type referred to as "underlying sidewalls".

In most of the known processes for tire building the carcass structure and the belting structure, together with the respective tread band, are provided to be made separately from each other at respective work stations, to be subsequently mutually assembled.

More particularly, accomplishment of the carcass structure first involves that the carcass ply or plies should be laid down on a first drum, usually identified as "building drum", to form a cylindrical sleeve. The annular reinforcing structures at the beads are fitted or formed on the opposite end flaps of the carcass ply or plies, that are then turned up around the annular structures so as to enclose them as in a loop.

Simultaneously, on a second or auxiliary drum an outer sleeve is buildingd which is made up of the belt layers laid down in radially superposed relationship with respect to each other and to the tread band applied to the belt layers at a radially outer position. The outer sleeve is then picked up from the auxiliary drum to be transferred onto the carcass sleeve for the purpose of carrying out coupling therewith.

Assembling between the carcass sleeve and outer sleeve can be executed on the same drum used for making the carcass sleeve, in which case the concerned process is identified as "one-step manufacturing process". Alternatively, assembling can be executed on a so-called shaping drum onto which the carcass sleeve and outer sleeve are transferred, to carry out tire building following a so-called "two-step manufacturing process".

In the one-step process, application of the sidewalls takes place with the aid of the same building drum as used for formation of the carcass sleeve. The process varies depending on whether the sidewalls are first laid down on the drum or they are directly laid down on the carcass sleeve after the end flaps thereof have been turned up around the annular reinforcing structures. In the last mentioned case, in order to obtain a construction pattern of the "underlying sidewall" type, each sidewall is provided to be made by laying down a strip of elastomer material on the carcass sleeve disposed in a cylindrical conformation on the drum, taking good care that the axially outer edge of the elastomer material strip should be positioned in superposed relationship with the end flap of the carcass ply already turned up around the annular reinforcing structure. The width of the elastomer material strips is such selected that the outer end flaps of the sidewalls lend themselves to be covered with the side edges of the tread band when, concurrently with an axial approaching movement of the two halves forming the drum and retaining the respective annular reinforcing structures of the carcass sleeve, said carcass sleeve is shaped into a toroidal configuration for matching with the inner surface of the outer sleeve previously placed at a centred position on the drum.

On the contrary, in order to obtain a construction pattern of the "overlying sidewall" type, it is preferable for the strips of elastomer material designed to make the sidewalls to be laid down on the building drum at an axially outer position with respect to the annular reinforcing structures.

The sidewall strips can be paired with the end flaps of the carcass ply so as to be turned up together with the latter, or they may stay separated from said flaps in order to enable turning up of the end flaps around the annular reinforcing structures at the beads separately from turning-up of the sidewalls, generally before shaping the carcass sleeve into a toroidal conformation.

At all events, after the carcass structure has been shaped into a toroidal configuration and matched with the outer sleeve, appropriate expandable portions of the building drum, consisting of a system of levers or of inflatable bags for example, cause overturning of the strips of elastomer material in order to apply them against the side surfaces of the carcass structure.

Methods and apparatuses operating in accordance with the above-mentioned principles are described in documents FRA-2.093.180 and U.S. Pat. No. 3,990,931, for example.

Referring now to the two-step manufacturing processes, the construction pattern of the "underlying sidewall" type is obtained by laying down the elastomer material strips on the carcass sleeve in the same manner as above described with reference to the one-step manufacturing process.

In fact, the sidewalls are arranged on the carcass sleeve formed into a cylindrical conformation on the building drum, which in this case can be also called "first-step drum", to join the respective end flaps to the side edges of the tread band, concurrently with the step of shaping the carcass sleeve on the shaping drum, also referred to as "second-step drum".

The construction pattern of the "overlying sidewall" type can be obtained by applying the elastomer material strips designed to form the sidewalls directly on the carcass sleeve, as provided for the above-described corresponding pattern of the "underlying sidewall" type, while at the same type adopting particular expedients, such as use of strips of adhesion-preventing material for example, in order to make the elastomer strips fixedly adhere to the carcass ply only and exclusively close to the annular reinforcing structures.

After the carcass sleeve has been transferred to the shaping drum, each of the elastomer material strips is, by a manual action and/or with the aid of appropriate devices, radially and axially spread apart outwardly with respect to the sleeve, to enable removal of the adhesion-preventing films. Then shaping of the carcass into a toroidal conformation is carried out in order to match it with the outer sleeve previously placed at a centred position on the carcass sleeve itself. Subsequently, the spread-apart sidewalls are overturned with the aid of rolling devices or devices of other types, to be applied against the side surfaces of the carcass structure and the tread band.

In document EP-A-822059 an apparatus and a method are disclosed which enable the above described operations to be carried out without requiring application of adhesion-preventing films.

In document U.S. Pat. No. 5,380,384 the shaping step for application of the outer sleeve to the carcass sleeve is provided to be carried out on the first-step drum whereas the second-step drum is exclusively intended for carrying out all operations aiming at applying the sidewalls, in accordance with the construction pattern of the "overlying sidewall" type.

In an attempt to optimize distribution of the floor to floor times between the first and second steps in a two-step manufacturing process, in document EP 997.263 a proposal has been made to carry out application of the outer sleeve and subsequent application of the sidewalls completely on the shaping drum.

SUMMARY OF THE INVENTION

In accordance with the present invention, it has been found that by carrying out the processing steps aiming at applying the sidewalls on two separate drums, subsequently to the working operations on the building drum, optimisation of the floor to floor times can be further improved while at the same time surprising economical advantages are achieved, as a result of simplification of the machinery and the operating flexibility of same in connection with building of tires of different typologies and/or sizes.

In more detail, the invention relates to a method of manufacturing a tire for vehicle wheels, characterized in that before transferring the carcass sleeve to the shaping drum, the following steps are carried out: positioning said sidewalls on an intermediate drum, which sidewalls have respective inner end flaps facing each other and mutually spaced apart; transferring the carcass sleeve onto the intermediate drum; engaging the inner end flap of each sidewall against said carcass drum at one of the annular reinforcing structures at the beads.

More specifically, positioning of each sidewall comprises the step of winding up a strip of elastomer material around a first radially expandable portion of the intermediate drum.

Following said transferring step, the carcass sleeve is advantageously coaxially positioned around the intermediate drum with the annular reinforcing structures at the beads that are each disposed close to the inner end flap of one of said sidewalls.

The engagement step of the inner end flap of each sidewall is preferably carried out by radial expansion of the sidewalls placed on the intermediate drum.

It may be also advantageously provided that following radial expansion of the sidewalls, an end section of the inner end flap of each sidewall will be submitted to an additional radial expansion step and applied against an axially inner shoulder defined by the respective annular reinforcing portion at the bead.

In a preferential embodiment of the subject method, before or during radial expansion of the sidewalls, an axial tensioning step of the carcass sleeve is provided to be carried out.

In more detail, axial tensioning of the carcass sleeve is preferably accomplished by bringing pusher elements in thrust relationship with axially inner shoulders defined by the annular reinforcing portions at the beads.

Furthermore, the pusher elements are preferably caused to be axially moved apart from said axially inner shoulders before carrying out the additional radial expansion of said end sections.

In a first embodiment, said additional radial expansion is carried out as a continuation of the radial expansion of the sidewalls: alternatively, said additional radial expansion is carried out after completion of the tire by shaping of the carcass and application of the outer sleeve and the sidewalls, both in the overlying sidewall pattern and in the underlying sidewall pattern, as above described.

This second embodiment offers a high degree of security in maintaining the carcass centring during the operations for tire completion and facilitates subsequent moving away of the pusher elements, that are no longer constrained by the belting action exerted by the cylindrical carcass sleeve.

In a preferential embodiment the following steps are also provided: forming an outer sleeve comprising the belting structure and the tread band applied to the belting structure at a radially outer position thereof; placing the outer sleeve at a centred position around the carcass sleeve previously transferred onto the shaping drum, before terminating the shaping step.

According to a possible alternative embodiment, application of the sidewalls against the side surfaces of the carcass sleeve can be carried out before completing the shaping step.

It is a further object of the present invention to provide an apparatus for manufacturing tires for vehicle wheels, characterized in that it further comprises: an intermediate drum arranged for engagement of the carcass sleeve carried by said transfer devices; an auxiliary unit to position said sidewalls on the intermediate drum, said sidewalls having respective inner end flaps facing each other and mutually spaced apart; said intermediate drum comprising engagement devices to cause engagement of the inner end flap of each sidewall against said carcass sleeve, at one of the annular reinforcing structures at the beads.

Preferably, said engagement devices comprise first radially expandible portions of the intermediate drum.

Advantageously, these first radially expandable portions define respective rest seatings for the sidewalls positioned on the intermediate drum.

It is further preferably provided that said engagement devices should comprise auxiliary expandible portions located at axially inner positions with respect to the first radially expandible portions and movable between a rest condition in which they are substantially in radial alignment with the first expandible portions themselves, and an operating condition in which they radially project from the first radially expandible portions.

Each of said auxiliary radially expandible portions advantageously offers a rest seating for the inner end flap of one of said sidewalls.

It is also provided that in the operating condition, each of said auxiliary radially expandible portions should have one axially outer surface thereof in abutment relationship with an axially inner shoulder defined by one of said annular reinforcing portions at the bead, to apply the inner end flap of the respective sidewall against the shoulder itself.

Preferably, the intermediate drum further comprises pusher elements axially movable between a rest position which is axially internal with respect to the inner end flaps of the sidewalls disposed on the intermediate drum, and an operating position in which said pusher elements are radially superposed with respect to the inner end flaps of the sidewalls.

In more detail, said pusher elements in the operating position act against axially inner shoulders defined by said annular reinforcing portions at the bead, to give rise to an axial tensioning of the carcass sleeve engaged on the intermediate drum.

In a preferential embodiment, said applicator devices comprise radially expandible diaphragm elements arranged to supply rest seatings for the sidewalls carried by the carcass sleeve transferred to the shaping drum.

It is also preferably provided that said transfer devices should comprise a first transferring member to move the carcass sleeve from the building drum to the intermediate drum and a second transferring member to move the carcass sleeve together with the sidewalls associated therewith from the intermediate drum to the shaping drum.

BRIEF DESCRIPTION OF THE DRAWINGS

Further features and advantages will become more apparent from the detailed description of a preferred but not exclusive embodiment of a method and an apparatus for manufacturing a tire for vehicle wheels in accordance with the present invention. This description will be set forth hereinafter with reference to the accompanying drawings given by way of non-limiting example, in which.

DETAILED DESCRIPTION OF THE PREFERRED EMBODIMENTS

Figure 1:
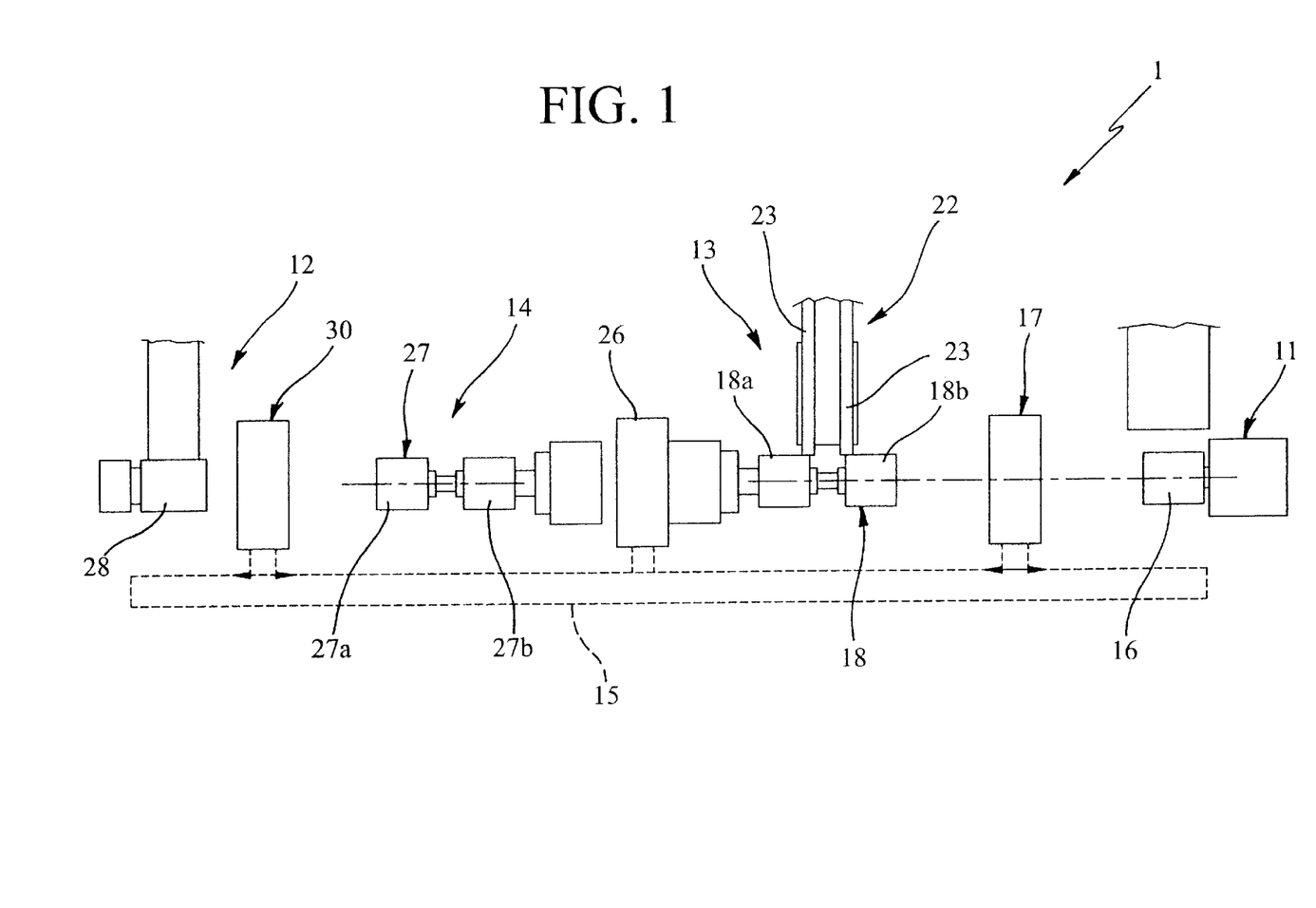
FIG. 1 is a diagrammatic plan view of an apparatus for manufacturing tires in accordance with the present invention.

Referring particularly to FIG. 1, an apparatus for manufacturing tires for vehicle wheels in accordance with the present invention has been generally identified by reference numeral 1.

Figure 9:
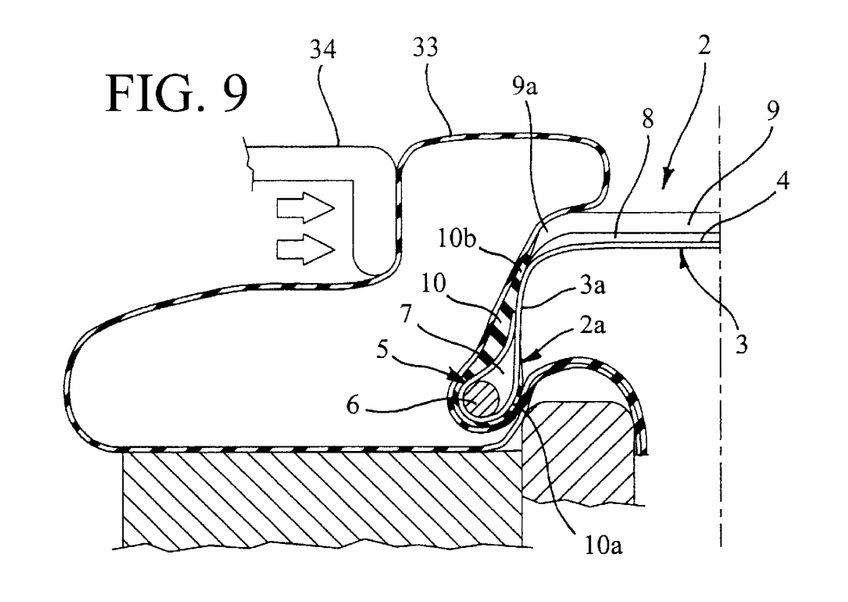
FIG. 9 shows the shaping drum during an operating step in which the, sidewalls are applied against the side portions of the carcass sleeve.

Apparatus 1 is arranged to make tires, one of which is diagrammatically shown in FIG. 9 and identified by 2, essentially comprising a carcass structure 3 having at least one carcass ply 4 provided with axially opposite circumferential flaps 4a turned up at respective annular reinforcing structures 5 that, in the finished tire, are incorporated into the tire regions usually identified as "beads" 2a, localized along the inner circumferential edges of the tire itself.

In the embodiment shown, each annular reinforcing structure 5 comprises a circumferentially inextensible annular insert 6, usually called "bead ring" and an elastomeric filler 7 applied to the bead ring itself at a radially outer position. Obviously the possibility of providing annular reinforcing structures 5 different in construction from the above-described one is not excluded.

Associated with the carcass structure 3, at a radially outer position, is a belting structure 8 usually comprising one or more belt layers. Applied to the belting structure 8, at a radially outer position thereof, is a tread band 9 intended to provide the ground-contact surface of tire 2.

Respective sidewalls 10 of elastomer material are applied to the side surfaces 3a of the carcass structure 3, each of which radially extends from one of the side edges 9a of the tread band 9 until close to the region of the annular reinforcing structure 5; each of said sidewalls 10 conveniently has an inner end flap 10a axially turned up, from outside to inside, around the respective annular reinforcing structure 5, and an outer end flap 10b laterally superposed on the corresponding side edge 3a of the tread band 9.

The inner 10a and outer 10b end flaps can belong to respective portions of the sidewall made of different elastomer materials, i.e. an inner portion made of a relatively hard wear-resistant blend for protecting the bead from rubbing against the rim surfaces during use of the tire, and an outer portion made of a low-hysteresis natural rubber blend for example, in order not to cause overheating due to deformations that cyclically occur at the ground-contacting area of the tire during running.

As diagrammatically shown in FIG. 1, the apparatus comprises a first work station 11 at which the carcass structure 3 is buildingd and a second work station 12 intended for accomplishment of the belting structure 8 with the tread band 9 applied thereto. Also provided is a third work station 13 where, as better clarified in the following, initial engagement of the sidewalls 10 with the carcass structure 3 is carried out, as well as a fourth work station 14 wherein coupling between the carcass structure 3 and the belting structure 8 and final application of the sidewalls 10 against the side walls of the carcass structure 3 occur. One or more transfer lines 15 or equivalent devices carry out transfer of the carcass structure 3 from the first work station 11 to the third work station 13, and from the latter to the fourth work station 14.

Figure 2:
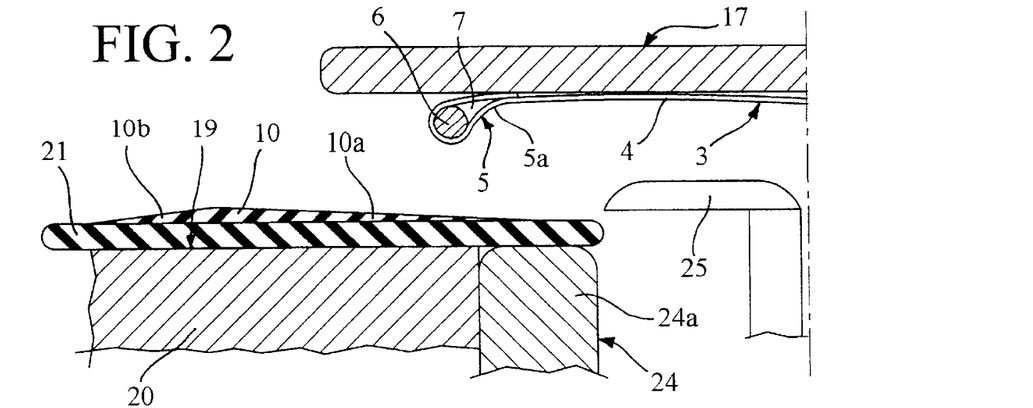
FIG. 2 is a partial half-section diagrammatically showing an intermediate drum used for manufacturing tires in accordance with the invention, during an operating step in which it is about to receive in engagement a carcass sleeve previously formed on a building drum.

Accomplishment of the carcass structure 3 is performed on a cylindrical building drum 16 (FIG. 1), also referred to as first-step drum, in any convenient manner for a person skilled in the art, for instance through winding of the carcass ply or plies 4 around the drum itself, axial fitting of the annular reinforcing structures 5 around the opposite circumferential flaps 4a of the carcass ply or plies 4, and turning up of the circumferential flaps 4a around the annular reinforcing structures 5. At the end of the operations accomplished on the building drum 6, the carcass structure 3 is obtained, the latter being in the form of a cylindrical sleeve, usually called "carcass sleeve", which at the turned-up circumferential flaps 4a is provided with the annular reinforcing structures 5 radially projecting towards the geometric axis of the sleeve itself, as shown in FIG. 2 for example.

Upon the action of a first transferring member 17, the carcass sleeve 3 is then removed from the building drum 16, upon radial shrinkage of the latter, to be transferred to the third work station 13 where it is fitted on an intermediate drum 18 better shown in FIGS. 2 to 5.

Associated with the intermediate drum 18 are engagement devices to produce engagement of the inner end flap 10a of each sidewall 10 against the carcass sleeve 3. In more detail, as viewed from FIG. 1, the intermediate drum 18 is made up of two halves 18a, 18b which are coaxially aligned and integral with each other for rotation, and which incorporate first radially expandable portions 19 arranged to engage the carcass sleeve 3 at the annular reinforcing structures at the beads 5.

Each of the first radially expandable portions 19 can be defined for example by a plurality of sectors 20 (only one of which is shown) which are circumferentially distributed around the geometric axis of the intermediate drum 18, being enclosed by an elastic annular band 21 defining a continuous rest seating for the respective sidewall 10. Sectors 20 are radially movable between a work condition in which, as shown in FIGS. 4 and 5, the first radially expandible portions 19 act in thrust relationship with the annular reinforcing structures 5 of the carcass sleeve 3, and a rest condition in which the expandible portions are radially retracted with respect to the annular reinforcing structures 5, as viewed from FIGS. 2 and 3, to enable axial insertion and removal of the carcass sleeve 3 from the intermediate drum 18.

Also provided on drum 18 are retention devices, that are neither shown nor described in detail because they can be made in any known manner, intended for holding the leading portion of the sidewall strip during winding up of same on drum 18, before junction of said leading portion with the trailing portion of the strip.

In addition and preferably, associated with each of the first radially expandible portions 19, at an axially inner position, is an auxiliary expandible portion 24. Each auxiliary expandible portion 24 is made up of a plurality of blocks 24a (only one of which is shown) circumscribed by the respective elastic annular band portion 21 and radially movable between a rest condition in which they are substantially in radial alignment with the respective first expandible portion 19 (FIGS. 2 to 4), and an operating condition in which they radially project with respect to the first expandible portion (FIG. 5), for the purposes better clarified in the following.

Advantageously associated with the third work station 13 is at least one auxiliary unit 22 upon the action of which positioning of the sidewalls 10 on the intermediate drum 18 is carried out, before engagement of the carcass sleeve 3 on the intermediate drum itself.

This auxiliary unit 22, which is neither shown nor described in detail because it can be made in any convenient manner, essentially comprises feed devices consisting of static or power-driven guide and transport systems 23 (chute-like guide elements or conveyor belts) adapted to guide at least one strip of elastomer material designed to constitute one of the sidewalls 10 along each of the first radially expandible portions 19 arranged in a rest condition In more detail, the strip can be picked up for example from a feed reel or other continuous delivery or building device and guided towards a respective application region positioned tangentially of the intermediate drum 18, while said drum is being driven in rotation around its own axis in a full revolution to produce the circumferential distribution of the strip itself. Appropriate cutting means can be associated with the auxiliary unit 22 to cut each strip to a length corresponding to the circumferential extension of the intermediate drum 18 in the application region, immediately before or after the above-described step involving positioning of sidewalls 10.

Said auxiliary unit 22 can be provided with controls for start and operation of said retention devices holding the leading portion of the strip on the drum.

When the above operation has been completed, as shown in FIG. 2, the sidewalls 10 are each shaped in the form of an annular band having a cross-section outline axially extending from the intermediate drum 18, and they have the respective inner end flaps 10a facing each other and mutually spaced apart of an amount substantially depending on the distance between the centres of the annular reinforcing structures 5 of the carcass sleeve 3, each flap having an end section thereof in superposed relationship with one of the auxiliary expandible portions 24 set in a rest condition.

Under this circumstance, the intermediate drum 18 lends itself to receive in engagement the carcass sleeve 3 that, through the first transferring member 17, is coaxially fitted on the drum itself, with the annular reinforcing structures 5 that are each located at the inner end flap 10a of one of the sidewalls 10.

Pusher elements 25 may be advantageously associated with the intermediate drum 18 to cause a centring and axial tensioning action of the carcass sleeve 3 so as to ensure a correct positioning of the annular reinforcing structures 5 simultaneously with the step of engaging the sleeve itself on the intermediate drum 18.

In more detail, it is provided that a series of circumferentially distributed pusher elements 25, only one of which is shown in the figures, should be associated with each of the halves 18a, 18b of the intermediate drum 18. The pusher elements 25 are axially movable between a rest position, in which they are located at an axially inner position with respect to the auxiliary expandible portions 24 and, as a result, with respect to the inner end flaps 10a of the respective sidewalls 10 positioned on the intermediate drum 18, and an operating position in which they are radially superposed with respect to the inner end flaps themselves. The pusher elements 25 may be also provided to be radially movable between a contracted condition in which, as shown in FIG. 2, they enable axial fitting of sleeve 3 on the intermediate drum 18, and a use condition in which, as shown in FIGS. 3 and 4, they act against the inner cylindrical surface of the carcass sleeve.

Said axial and radial movements may be also provided to be made simultaneously with a single rotatory motion.

After the carcass sleeve 3 has been coaxially fitted on the intermediate drum 18, the pusher elements 25 are simultaneously brought to the use condition and subsequently moved from the rest position to the operating position. In the operating position, as shown in FIG. 3, the pusher elements 25 act in thrust relationship with inner shoulders 5a defined by the annular reinforcing structures 5, so as to produce the desired centring and axial tensioning of the carcass sleeve 3.

Figure 3:
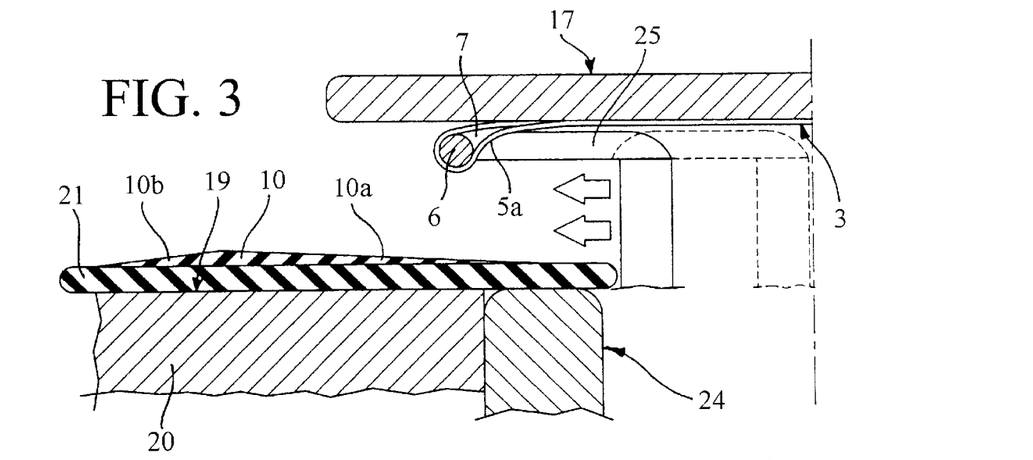
FIG. 3 shows the intermediate drum of FIG. 2 during a subsequent operating step in which the carcass sleeve is submitted to axial tensioning.
Figure 4:
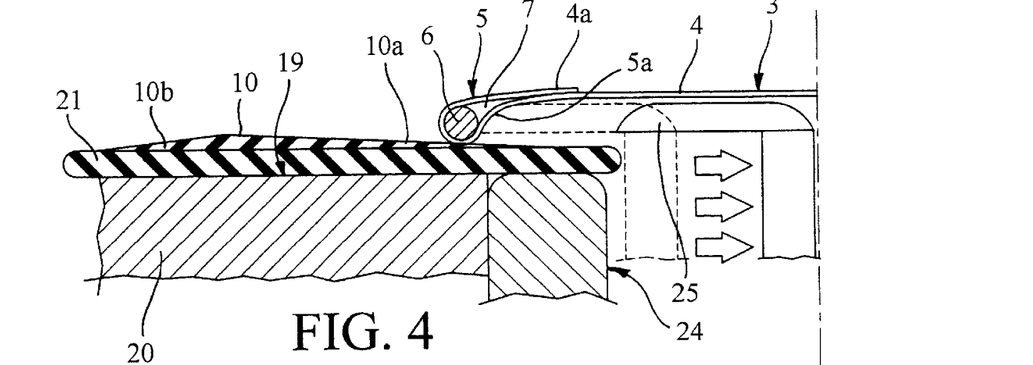
FIG. 4 shows the intermediate drum during an operating step in which, upon the action of first radially expandible portions thereof, engagement of the carcass sleeve and the sidewalls is obtained at annular reinforcing structures at the beads.
Figure 5:
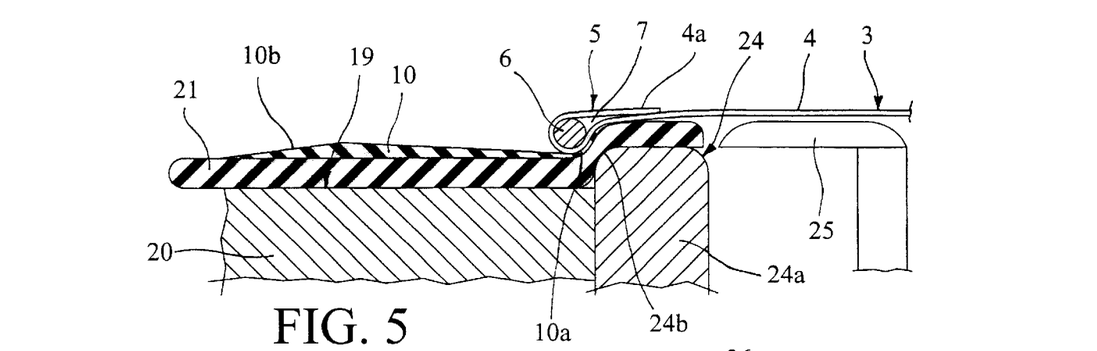
FIG. 5 shows the intermediate drum during an operating step in which, upon the action of auxiliary expandible portions, application of the inner end flaps of the sidewalls against inner shoulders of the annular reinforcing structures at the beads is accomplished.

Then, radial translation of sectors 20 is accomplished in any manner convenient for a person skilled in the art, to bring the first radially expandible portions 19 to the operating condition and consequently give rise, as can be understood from a comparison between FIGS. 3 and 4, to a radial expansion of the sidewalls 10. Thus, as viewed from FIG. 4, application of the inner end flap 10a of each sidewall 10 against the annular reinforcing structure 5 is obtained, at a radially inner position with respect to the tire 2 bead, thereby ensuring steadiness in the mutual positioning between the sidewalls 10 and the remaining parts of the tire during the subsequent process steps.

After moving the pusher elements 25 axially away from the axially inner shoulders 5a of the annular reinforcing structures 5, intervention of the radial blocks 24a is operated to bring the auxiliary expandible portions 24 to the operating condition, so that an additional radial expansion is imposed to the end section of the inner end flap 10a of each sidewall 10. As viewed from FIG. 5, under this operating condition each of the auxiliary expandible portions 24 has an axially outer surface thereof 24b in abutment relationship with the axially inner shoulder 5a defined by the respective annular reinforcing portion 5, thereby giving rise to application of the end section of the end flap 10a against the shoulder itself.

In order to make application of the inner end flaps 10a to the annular reinforcing portions 5 steadier, each of the radially expandible portions 19 and/or the elastic annular band 21 associated therewith may be advantageously such shaped as to define a diametrical shoulder capable of giving rise to application of the end flap 10a laterally against the annular reinforcing portion 5, on the opposite side from the axially inner shoulder 5a.

A perfect adhesion between the parts can be further promoted by an elastic static element, or an inflatable element which better adapts itself to the carcass sleeve shape.

Alternatively, a possible rolling action may be provided for the purpose of pressing the annular reinforcing structures 5 against the end flaps 10a. When application has been completed, the elastomer material forming the inner flap 10a of each sidewall 10 offers an additional protection to the tire 2 bead, which is advantageous in terms of functional features of the tire under use conditions.

The carcass sleeve 3 is then engaged by a possible second transferring member 26 that, upon shrinkage of the first expandable portions 19 and the auxiliary expandible portions 24 to the rest condition, removes it from the intermediate drum 18 and transfers it to a shaping drum 27 on which the process for accomplishing the tire will be completed.

Before or after execution of the previously described steps, building of the belting structure 8 provided with a respective tread band 9 is carried out in the second work station 12. This working too may be accomplished in any convenient manner, for instance by winding up one or more sequentially-superposed belt layers on an auxiliary drum 28 (FIG. 1), of the so-called "comb" type for example, which is provided with radially expandible sectors. Once formation of the belting structure 8 has been completed, application of the tread band 9 occurs, so as to form a composite outer sleeve 29 of cylindrical conformation which is then removed from the auxiliary drum 28 to be transferred, by a third transferring member 30 operating on the transfer line 15 for example, to the fourth work station 14 and fitted at a centred position on the carcass sleeve 3 previously engaged on the shaping drum 27.

If preferred, the functions of the second transferring member 26 can be accomplished by the above-described first transferring member 17 and/or the third transferring member 30.

The shaping drum 27 is made up of two coaxially-aligned halves 27a, 27b which are axially movable with respect to each other, in each of which a main grasping portion 31 and a possible axially-internal auxiliary grasping portion 32 are defined, said portions being expandible to engage the carcass sleeve 3 at the annular reinforcing structures 5 at the beads, in the same manner as described with reference to the intermediate drum 18. Alternatively, the auxiliary grasping portion 32 may be made like the above illustrated pusher element 25.

Intervention of the main 31 and auxiliary 32 grasping portions can be preceded by an action exerted by possible auxiliary pusher elements (not shown) arranged to cause centring and axial tensioning of the carcass sleeve 3 in the same manner as previously described with reference to the pusher elements 25 associated with the intermediate drum 18.

The third transferring member 30 brings the outer sleeve 29 to a centred position with respect to the carcass sleeve 3 engaged on the shaping drum 27, with the sidewalls 10 still axially projecting from the annular reinforcing structures 5 and lying on applicator devices 33 consisting of expandible-diaphragm elements or inflatable bags externally covering the main 31 and auxiliary 32 grasping portions, instead of the elastic annular band 21 described with reference to the intermediate drum 18

Figure 8:
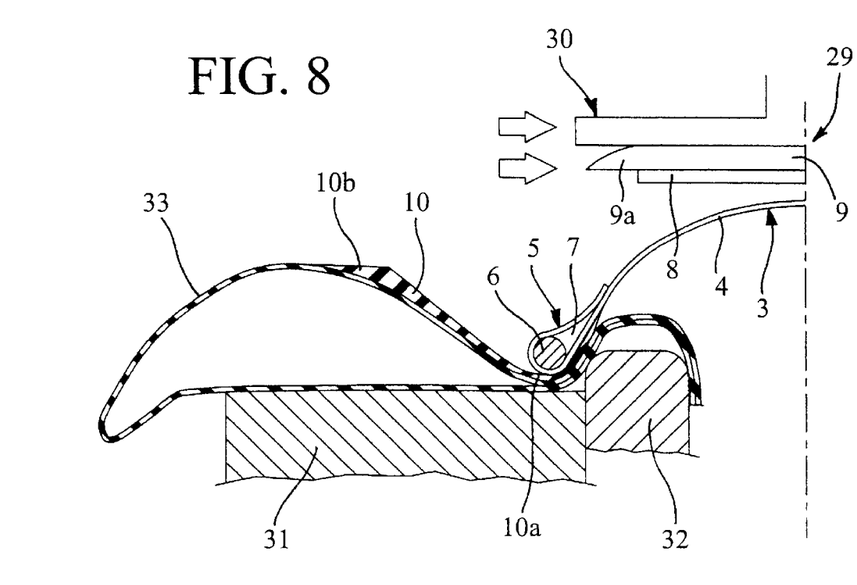
FIG. 8 shows the shaping drum during an operating step in which, following mutual axial approaching of the halves forming it, concurrently with inflation of the carcass sleeve and of diaphragm elements associated with the drum itself, coupling between said drum and an outer sleeve previously placed at a centred position is achieved.

Concurrently with the above operation, mutual axial approaching of halves 27a, 27b forming the shaping drum 27 is produced and simultaneously a working fluid is blown in within the carcass sleeve 3, so as to give it a toroidal conformation. During this step, the carcass sleeve 3 is submitted to a radial expansion bringing it close to the inner surface of the outer sleeve 19 until coupling between the carcass sleeve 3 and outer sleeve 19 takes place, as shown in FIGS. 8 and 9.

At the end of this operation a rolling step of the tread band 9 may be provided, preferably starting from a meridian plane of tire 2 towards the opposite side edges 9a of the tread band itself, to ensure a correct adhesion of the outer sleeve 19 against the carcass ply 4, as well as possible folding of the side edges against the carcass structure 3.

Concurrently with the shaping step, intervention of the inflatable bags 33 or equivalent applicator devices associated with the shaping drum 27 is operated to cause application of each sidewall 10 against a corresponding one of the side surfaces 3a of the carcass sleeve 3, extending, just as an indication, between the annular reinforcing structure 5 and the side edge 9a of the tread band 9.

Figure 6:
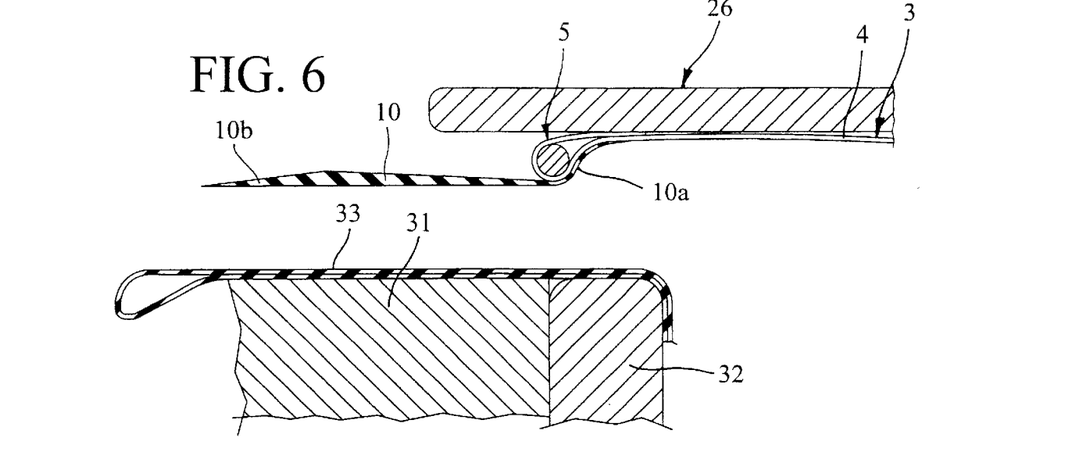
FIG. 6 is a diametrical half-section diagrammatically showing an operating step in which the carcass sleeve together with the sidewalls is about to be engaged on a shaping drum.
Figure 7:
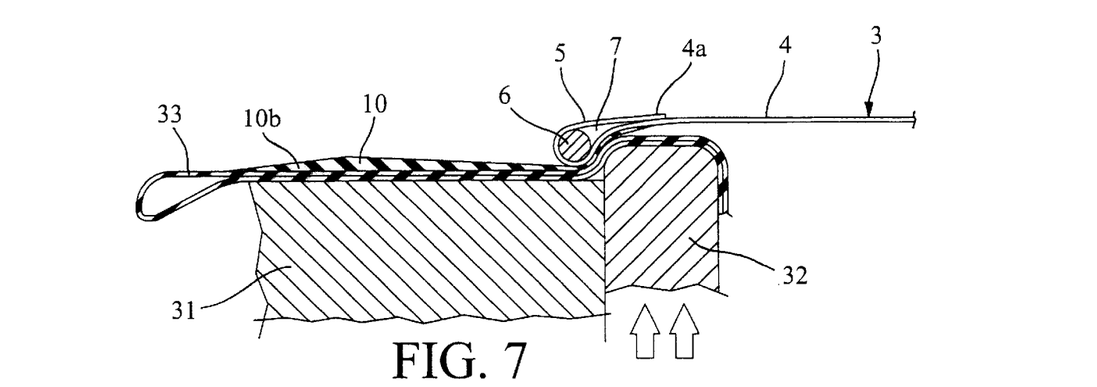
FIG. 7 shows the shaping drum during an operating step in which engagement of the carcass sleeve takes place, following radial expansion of primary and auxiliary grasping portions.

Each inflatable bag 33 lends itself to be deformed, by introduction of a working fluid under pressure, between a rest condition in which, as shown in FIGS. 6 and 7, it substantially has a cylindrical conformation flattened against the outer surface of the shaping drum 27, and an expansion condition in which it takes a substantially toroidal conformation. When bags 33 are inflated, the sidewalls 10 are turned up around the annular reinforcing structures 5 and moved close to the side surfaces 3a of the carcass structure 3, until they are brought into thrust relationship with the side surfaces themselves, possibly with the aid of intermediate rolling operations directly carried out on the sidewalls 10 to improve correct application of same, or of auxiliary thrust elements 34 giving rise to an axial thrust action on the inflatable bags 33.

Preferably, the width of the strips intended for formation of the sidewalls 10 is conveniently selected so that, when application has been completed, each sidewall 10 has the respective outer end flap 10b laterally superposed with respect to the side edge of the tread band 9.

As an alternative to the previously described operating sequence, aiming at obtaining a construction pattern of the "overlying sidewall" type, application of the sidewalls 10 against the side surfaces 3a of the carcass sleeve 3 may be provided to be completed before terminating the shaping step with consequent application of the carcass ply 4 against the outer sleeve 29. In this case, the side edges 9i a of the tread band 9 will be superposed at the outer end flaps 10b of the sidewalls 10, according to a configuration of the so-called "underlying sidewall" type.

Bags 33 are subsequently deflated and brought back to the rest position, the grasping portions 31, 32 of the shaping drum 27 being afterwards brought back too to the rest position to allow removal of the buildingd tire 2, after optionally carrying out a rolling action on the sidewalls 10 to consolidate adhesion thereof to the side surfaces 3a of the carcass structure 3.

The present invention achieves important advantages.

It should be in fact recognized that distribution of the operating steps for building of the tire on three drums instead of two drums as usually provided in the two-step production processes, gives rise to an important reduction in the floor to floor time on the individual drums, which is advantageous for productivity.

An optimal balancing of the floor to floor times in the individual work stations is also achieved, with an important reduction in downtime.

Each of the building, intermediate and shaping drums intended for carrying out a specific operation in the tire manufacturing process, is greatly simplified as compared with the drums that in known technical solutions were designed to execute several operating steps. This aspect gives rise to an unexpected reduction in the plant manufacturing costs, as well as to an important increase in the operating reliability and to a simplification of In addition and above all, the structural simplification of the individual drums offers the possibility of reducing the structural sizes of the same so as to adapt them to the production of tires of small sizes. This too is an important advantage because in the greatly-automated present processes use of machinery capable of producing tires with a rim-fitting diameter smaller, just as an indication, than fifteen inches is particularly complicated.

What is claimed is:

1. A method of manufacturing a tire for a vehicle wheel, comprising the steps of:

forming a carcass sleeve comprising a pair of annular reinforcing structures, axially-spaced-apart from each other, and at least one carcass ply having opposite end flaps each turned up at one of the annular reinforcing structures;

transferring the carcass sleeve onto a shaping drum;

shaping the carcass sleeve into a toroidal configuration to apply the carcass sleeve to a belt structure, at a radially-inner position of the belt structure, and a tread band circumscribing the belt structure; and applying a pair of sidewalls against respective side surfaces of the carcass sleeve, each of the pair of sidewalls extending between one of the annular reinforcing structures and a respective side edge of the tread band;

wherein, before transferring the carcass sleeve onto the shaping drum, the following steps are carried out:

positioning the sidewalls on an intermediate drum, wherein the sidewalls have respective inner end flaps mutually-spaced-apart and facing each other;

transferring the carcass sleeve onto the intermediate drum; and engaging the inner end flap of each sidewall against the carcass sleeve at a respective annular reinforcing structure.

2. The method of claim 1, wherein the step of positioning the sidewalls on the intermediate drum comprises winding up a strip of elastomer material around a first radially-expandable portion of the intermediate drum.

3. The method of claim 2, wherein, following the step of transferring the carcass sleeve, the carcass sleeve is coaxially positioned around the intermediate drum using the annular reinforcing structures.

4. The method of claim 3, wherein the step of engaging the inner end flap of each sidewall is carried out by radial expansion of the sidewalls positioned on the intermediate drum.

5. The method of claim 4, wherein, following radial expansion of the sidewalls, an end section of the inner end flap of each sidewall is subjected to an additional radial expansion step and applied against an axially-inner shoulder of the respective annular reinforcing structure.

6. The method of claim 5, wherein the additional radial expansion step is carried out subsequent to the step of shaping the carcass sleeve and the step of applying the pair of sidewalls.

7. The method of claim 4, wherein, before or during radial expansion of the sidewalls, a step of axial tensioning of the carcass sleeve is carried out.

8. The method of claim 7, wherein the step of axial tensioning of the carcass sleeve is accomplished by pusher elements in thrust relationship with axially-inner shoulders defined by the annular reinforcing structures.

9. The method of claims 8, wherein, following radial expansion of the sidewalls, an end section of the inner end flap of each sidewall is subjected to an additional radial expansion step and applied against an axially-inner shoulder of the respective annular reinforcing structure, and wherein the pusher elements are axially moved apart from the axially-inner shoulders before the additional radial expansion step.

10. The method of claim 1, further comprising the steps of:

forming an outer sleeve comprising the belt structure and the tread band applied to the belt structure at a radially-outer position of the belt structure; and placing the outer sleeve at a centered position around the carcass sleeve previously transferred onto the shaping drum before terminating the step of shaping the carcass sleeve.

11. The method of claim 1, wherein the step of applying the pair of sidewalls is carried out before completing the step of shaping the carcass sleeve.

12. An apparatus for manufacturing tires for vehicle wheels, comprising:

a building drum to form a carcass sleeve comprising a pair of annular reinforcing structures, axially-spaced-apart from each other, and at least one carcass ply having opposite end flaps each turned up at one of the annular reinforcing structures;

a shaping drum to form a tire comprising the carcass sleeve, a belt structure paired with a radially-external tread band, and a pair of sidewalls applied against respective side surfaces of the carcass sleeve, each of the pair of sidewalls extending between one of the annular reinforcing structures and a respective side edge of the tread band, applicator devices being associated with the shaping drum to apply the sidewalls to the respective side surfaces of the carcass sleeve;

one or more transfer devices for moving the carcass sleeve from the building drum to the shaping drum;

an intermediate drum for engaging the carcass sleeve moved by the transfer device; and an auxiliary unit to position the sidewalls on the intermediate drum, the sidewalls having respective inner end flaps mutually-spaced-apart and facing each other;

wherein the intermediate drum comprises engagement devices to engage the inner end flap of each sidewall against the carcass sleeve at respective annular reinforcing structures.

13. The apparatus of claim 12, wherein the engagement devices comprise first radially-expandable portions of the intermediate drum.

14. The apparatus of claim 13, wherein the first radially-expandable portions define respective rest seatings for the sidewalls positioned on the intermediate drum.

15. The apparatus of claim 13, wherein the engagement devices further comprise auxiliary radially-expandable portions located at axially-inner positions with respect to the first radially-expandable portions and movable between a rest condition, in which the auxiliary radially-expandable portions are substantially in radial alignment with the first radially-expandable portions, and an operating condition, in which the auxiliary radially-expandable portions radially project from the first radially-expandable portions.

16. The apparatus of claim 15, wherein each of the auxiliary radially-expandable portions offers a rest seating for the inner end flap of one of the sidewalls.

17. The apparatus of claim 15, wherein, in the operating condition, each of the auxiliary radially-expandable portions has one axially-outer surface abutting an axially-inner shoulder defined by one of the annular reinforcing structures to apply the inner end flap of the respective sidewall against the axially-inner shoulder.

18. The apparatus of claim 12, wherein the intermediate drum further comprises pusher elements axially movable between a rest position, which is axially internal with respect to the inner end flaps of the sidewalls disposed on the intermediate drum, and an operating position, in which the pusher elements are radially superposed with respect to the inner end flaps of the sidewalls.

19. The apparatus of claim 18, wherein the pusher elements in the operating position act against axially-inner shoulders defined by the annular reinforcing structures to give rise to an axial tensioning of the carcass sleeve engaged on the intermediate drum.

20. The apparatus of claim 12, wherein the applicator devices comprise radially-expandable diaphragm elements arranged to supply rest seatings for the sidewalls moved together with the carcass sleeve from the intermediate drum to the shaping drum.

21. The apparatus of claim 12, wherein the one or more transfer devices comprise:

a first transferring member to move the carcass sleeve from the building drum to the intermediate drum; and a second transferring member to move the carcass sleeve together with the sidewalls from the intermediate drum to the shaping drum.

* * * * *